United States Patent [19]
Cipriano

[11] 3,983,751
[45] Oct. 5, 1976

[54] METHOD OF MEASURING THE LEVEL OF ELEVATED TEMPERATURE PARTICULATE MATERIAL

[75] Inventor: Lincoln D. Cipriano, Olympia Fields, Ill.

[73] Assignee: Atlantic Richfield Company, Philadelphia, Pa.

[22] Filed: July 17, 1974

[21] Appl. No.: 489,208

[52] U.S. Cl. ................................. 73/295
[51] Int. Cl.² ........................ G01F 23/22
[58] Field of Search ........................ 73/295

[56] References Cited
UNITED STATES PATENTS

| | | |
|---|---|---|
| 1,775,540 | 9/1930 | Taylor ................................ 73/295 |
| 2,246,563 | 6/1941 | Winters ........................... 73/295 X |
| 3,279,252 | 10/1966 | Barlow ............................... 73/295 |
| 3,512,412 | 5/1970 | Weining ............................ 73/295 |
| 3,797,310 | 3/1974 | Babcock et al. ................... 73/295 |

FOREIGN PATENTS OR APPLICATIONS

| | | |
|---|---|---|
| 2,024,911 | 12/1971 | Germany ........................... 73/295 |
| 1,201,079 | 9/1965 | Germany ........................... 73/295 |

Primary Examiner—Richard C. Queisser
Assistant Examiner—John S. Appleman
Attorney, Agent, or Firm—Frank J. Uxa

[57] ABSTRACT

An apparatus for determining and/or monitoring the amount of particulate material in an accumulator, which material enters the accumulator at a temperature above the ambient temperature, comprising an accumulator body for holding particulate material; an inlet means located in the upper portion of the accumulator body to allow the particulate material to enter the accumulator body; and a plurality of temperature sensing means located at points of differing height in the accumulator body below the inlet means.

Improved methods for determining and/or monitoring the amount of particulate material entering an accumulator body through an inlet means at a temperature above the ambient are also disclosed.

16 Claims, 3 Drawing Figures

3,983,751

METHOD OF MEASURING THE LEVEL OF ELEVATED TEMPERATURE PARTICULATE MATERIAL

This invention relates to an apparatus and method for determining the amount of particulate material in an accumulator. More particularly, the invention relates to an apparatus and method for determining and monitoring the amount of particulate material in an accumulator, which particulate material enters the accumulator at a temperature above ambient.

Often in the process industries, situations arise requiring that particulate material be accumulated for storage, disposal and the like. For example, in the petroleum industry, catalyst particles are often employed to promote the cracking of hydrocarbons in fluidized bed reactor systems. As the catalyst particles circulate in the system, attrition causes the production of very fine particles. These fine particles are removed from the reaction system, for example, by passing a mixture of these particles and gaseous medium through cyclone precipitators which cause the particles and gaseous medium through cyclone precipitators which cause the particles of solid catalyst to settle into an accumulator. In another illustration, combustion debris, e.g., soot, carbon and the like, from burning heavy hydrocarbon fuels to produce, for example, steam, is often collected to avoid undue air pollution. This debris in admixture with combustion flue gas is run through, for example, electrostatic precipitators, to remove solid materials from the gas exiting the combustion zone and this material is collected in an accumulator for disposal. In order to promote process efficiency, it would be advantageous to be able to monitor the amount of material in the accumulator at any given time. For example, if this material, e.g., catalyst particles, solid combustion debris and the like, is allowed to accumulate beyond the capacity of the vessel, the operation of the separation apparatus, e.g., cyclone or electrostatic precipitator, may be impaired or the apparatus itself may be damaged. Thus, not only would it be advantageous to determine the aount of particulate material in an accumulator, but also it would be helpful to provide means by which it can be determined whether more or less than a predetermined amount of material is present in the accumulator.

Therefore, one of the objects of the present invention is to provide an apparatus for determining or monitoring the amount of particulate material in a accumulator.

A further object of the present invention is to provide an apparatus for determining whether more or less than a predetermined amount of particulate material is present in an accumulator.

Another object of the present invention is to provide a method for determining or monitoring the amount of particulate material in an accumulator.

An additional object of the present invention is to provide a method for determining whether more or less than a predetermined amount of particulate material is present in an accumulator. Other objects and advantages of the present invention will become apparent hereinafter.

An apparatus has now been discovered for determining and/or monitoring the amount of particulate material in an accumulator, which material enters the accumulator at a temperature above the ambient temperature. The apparatus comprises an accumulator body for holding this particular material; and inlet means located in the upper portion of the accumulator body to allow the particulate material to enter the accumulator body; and a plurality of temperature sensing means located at points of differing hight in the accumulator body below the inlet means. In a preferred embodiment, the apparatus further comprises an outlet means located in the lower portion of the accumulator body, more preferably below the lowermost of the temperature sensing means, to allow particulate material to exit the accumulator body. In addition, the outlet means may include moveable closure means, e.g., a slide valve, which acts to control the amount of particulate material exiting the accumulator body.

In another embodiment, the apparatus of the present invention further comprises at least one alarm signaling means for signaling when more and/or less than a predetermined amount of particulate material is present in the accumulator body. This alarm signaling means is conventional and often operates in conjunction with the temperature sensing means as will become apparent hereinafter.

An improved method for determining and/or monitoring the amount of particulate material in an accumulator body has been discovered. The particulate material enters the accumulator body through an inlet means at a temperature above the ambient. The improved method comprises: (1) determining the temperature at a plurality of points of differing height in the accumulator body below the inlet means; and (2) repeating step (1) periodically provided that a reduced temperature at any lower point relative to the temperature at the uppermost of these points being indicative that said lower point is below the level of the particulate material present in the accumulator body and essentially no change in temperature at the lower point relative to the uppermost of these points being indicative that the lower point is above the level of the particulate material present in the accumulator body. The indicative reduction in temperature referred to above is often at least about 30°F., preferably about at least 60°F., and more preferably, at least about 100°F.

The present apparatus and method can be used together. In other words, the present method can be used to determine the amount of particulate material present in the accumulator body of the present apparatus. To further illustrate, the moveable closure means of the outlet means can be made to open and/or close in response to the temperature differences observed between two or more points of differing height in the accumulator body thus effftively controlling the amount of particulate material present in the accumulator body. In addition, the alarm signaling means of the present apparatus can function in response to the temperature differneces between two or more points of differing height in the accumulator body to signal a condition in which more and/or less particulate material relative to a predetermined amount is present in the accumulator body.

Thus, an improved method for determining when more than a predetermined amount of particulate material is present in an accumulator has now been found, the particulate material entering the accumulator body through an inlet means at a temperature above the ambient. This method comprises: (1) determining the temperature at two points of differing height in the accumulator body below the inlet means, the lower of these points being above the level of particulate material when the predetermined amount of this material is present in the accumulator body; and (2) repeating step (1) periodically provided that a decrease in temperature of approximately the same magnitude as noted above (i.e., often at least about 30°F., preferably at least about 60°F., and more preferably at least about 100°F.) at this lower point relative to the temperature at the upper point being indicative that more than the predetermined amount of particulate material is present in the accumulator body. Conversely, an improved method for determining when less than a predetermined amount of particulate material is present in an accumulator has also been discovered. The method comprises: (1) determining the temperature at two points of differing height in the accumulator body below the inlet means the lower of these points being below the level of particulate material when the predetermined amount of this material is present in the accumulator body; and (2) repeating step (1) periodically provided that an increase in temperature of, for example, at least about 30°F., preferably at least about 60°F., and more preferably, at least about 100°F., at this lower point relative to the temperature at the upper point being indicative that less than the predetermined amount of particulate material is present in the accumulator body. The temperature at the lower point need not equal or exceed the temperature at this upper point, only increase relative to the temperature of the upper point. In other words, provided that the temperature of the lower point increases, a reduced difference between the temperature at the upper and lower points is indicative that less than the predetermined amount of particulate material is present in the accumulator body.

It is important in the present invention that the particulate material as it enters the accumulator body be at a temperature above the ambient temperature, i.e., the temperature of the surrounding environment in which the accumulator body is situated. Often, the temperature of this entering particulate material is at least about 100°F., preferably at least about 150°F., and more preferably at least about 250°F., higher than the ambient temperature.

The accumulator body of the present apparatus may be of any size and geometry suitable for the particular application involved. In certain instances, e.g., where particulate material at elevated temperatures is separated by, for example, cyclone or electrostatic precipitation, from gases, the accumulator body is cylindrical in configuration having a lower portion which is an inverted and truncated cone. In a preferred embodiment, at least a major portion of the temperature sensing means are located in the lower portion of the accumulator body. Typically, the accumulator body has a volume of from about 20 cubic feet or less to about 10,000 cubic feet or more. The apparatus of the present invention may be fabricated from any suitable material of construction. The material of construction used is dependent upon the particular application involved. In many instances, metals and metal alloys, such as iron, carbon steel or stainless steel, copper and the like, may be used. Of course, the apparatus should be made of a material or combustion of materials which is substantially unaffected by the particulate material and the like conditions, e.g., temperatures, pressures and the like, at which the apparatus is normally operated. In addition, such material or materials should have no substantial detrimental effect on the particulate material being processed.

In another embodiment, it is preferred that the present apparatus further comprise an outlet means located in the accumulator body at a height below the inlet means to allow at least intermittant removal of particulate material from the accumulator body. It is preferred that the outlet means be located below the temperature sensing means.

The present apparatus includes a plurality of temperature sensing means located at points of differing height in the accumulator body. These temperature sensing means may be any device conventionally used to determine temperature. Such temperature sensing means include bimetallic thermometers, resistance thermometers, liquid in glass thermometers, pressure-filled expansion thermometers, liquid pressure thermometers, gas pressure thermometers, thermisters, metal-metal thermocouples and the like. However, it is preferred that conventional metal-metal thermocouples be used as the temperature sensing means. Such thermocouples use the principle of thermoelectricity to measure temperatures. For example, two metal wires of different compositions are crossed, e.g., by welding, at the point, i.e., "hot junction, " at which the temperature is to be sensed. One end of each wire is connected to a millivoltmeter, galvanometer or potentiometer calibrated for temperature. As the temperature varies at the hot junction, the electrical potential generated varies. Temperature can be determined by reading the calibrated millivoltmeter, galvanometer or potentiometer. Typical metal-metal thermocouples comprise the following combinations of metals: platinum and platinum-rhodium (e.g., 90% by weight platinum, 10% by weight rhodium); chromel (e.g., 90% by weight nickel, 10% by weight chromium) and alumel (e.g., 95% by weight nickel, 2% by weight aluminum, 3% by weight manganese and 1% by weight silica); iron and constantan (e.g., 60% by weight copper, 40% by weight nickel); copper and constantan; and the like. The choice of which type of thermocouple, e.g., which metal-metal combination, to use often depends on the conditions, e.g., temperatures, expected or experienced in any given application.

When thermocouples are used in the present invention, they are often disposed in a sheath in the accumulator body to protect the thermocouple from possible damage from the particulate material and/or to allow more efficient removal and replacement of these devices. These sheaths may be made of any material which is conventionally used for this purpose. Often, the sheath material have essentially no heat insulating capability, in other words, the thermocouple sheaths are often made of heat conductors, for example, metals, such as stainless steel, nickel, copper, mixtures thereof, and the like. The thermocouple metals themselves are often protected by conventional electrical insulation, such as porcelain or lava tubes or magnesium oxide packing through which the metal wires are threaded. Of course, the hot junction, i.e., the point at which the temperature is measured, is left uninsulated. In addition, the sheath material should have no substantial detrimental effect on the particulate material being accumulated and should be selected so that the environment inside the accumulator body has no substantial detrimental effect on the sheath.

In one embodiment, the temperature sensing means can be located along the centerline of the accumulator body. For example, a series of thermocouples in a single sheath, can be located at points of differing height coincidental with the centerline of the accumulator body. It is preferred that each of the points at which the temperature is sensed be essentially equidistant from the nearest outer wall of the accumulator body. In a preferred embodiment, each of the temperature sensors, e.g., separately sheathed thermocouples, is located a given, preferably equal, distance in from the outer wall of the accumulator body.

The particulate material which is accumulated may be of any size, for example, having a maximum linear dimension of from about 1 micron or less to about 1 inch or more. Preferably, however, the major amount of pparticulate material by weight which is accumulated has a maximum linear dimension in the range from about 1 micron to about 10,000 microns, more preferably from about 1 micron to about 500 microns. By "maximum linear dimension" is meant the maximum straight line dimension such as length, width, depth, diameter and the like, of a particle. The perrimeter and circumference of a particle are not straight line dimensions.

The accompanying drawings, in which like parts bear like reference numerals, illustrate certain of the embodiments and advantages of the present invention. In the drawings.

Figure 1:
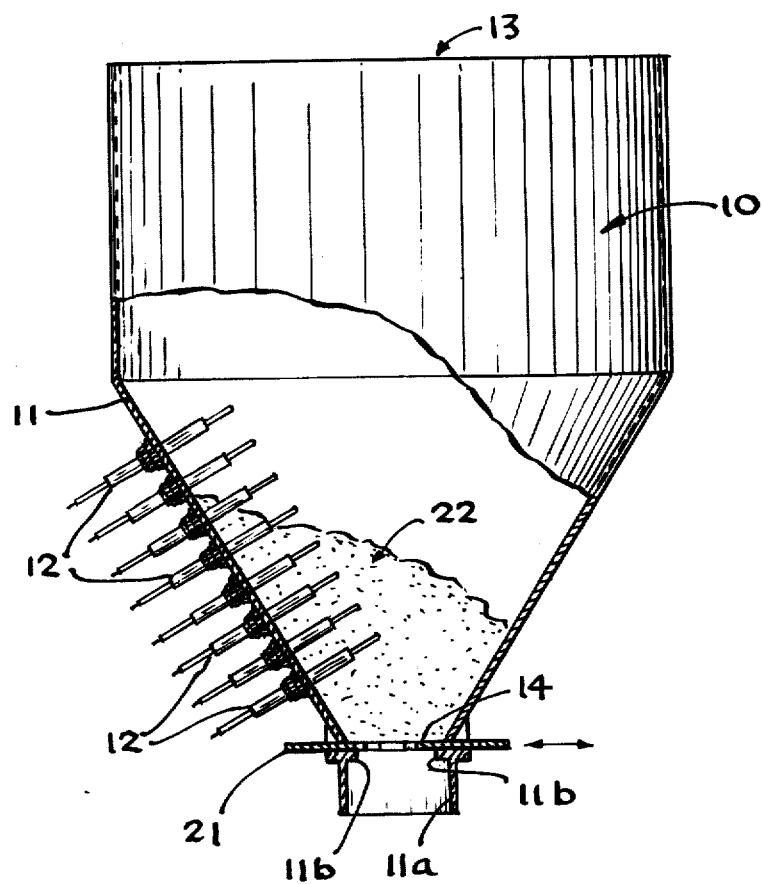
FIG. 1 is a side elevational view, partly in section, of an apparatus of the present invention.

Referring now to the FIG. 1, an accumulator body, shown generally as 10, has an inverted truncated conically shaped lower portion 11. Attached to the side of lower portion 11 are a plurality of temperature sensor assemblies 12, which will be discussed in detail hereinafter. The temperature sensor assemblies 12 are each attached to the lower portion 11 so that the points at which the temperature is sensed are essentially equidistant from the nearest outer wall of lowser portion 11, i.e., the wall of lower portion 11 to which the temperature sensing assemblies 12 are attached. In addition, the distances between individual temperature sensing assemblies 12 along this wall of lower portion 11 are essentially equal.

Accumulator body 10 also includes an inlet means shown generally as 13 which allows particulate material 22 to enter accumulator body 10 and lower portion 11 at a temperature higher than the ambient temperature. Accumulator body 10 is also equipped with an outlet means 14 allowing particulate material 22 to exit lower portion 11. Slide valve 21 located adjacent outlet means 14 can be opened intermittently to allow particulate material 22 to exit lower portion 11 through outlet means 14. Lower portion 11 has an extension 11a attached by means of supports 11b. As can be seen in FIG. 1, slide valve 21 is disposed in the space between lower portion 11 and extension 11a. Slide valve 21 can be moved horizontally to allow particulate material 22 to exit lower portion 11 through outlet means 14 and extension 11a. Conversely, if it is desired to restrict particulate material 22 from leaving lower portion 11, slide valve 21 can be again moved horizontally to restrict or eliminate fluid communication between lower portion 11 and extension 11a. As discussed previously, slide valve 21 can be "open or shut" so that particulate material 22 can flow from lower portion 11 through extension 11a at a controlled rate in response to the temperature sensed by temperature sensor assemblies 12.

Figure 2:
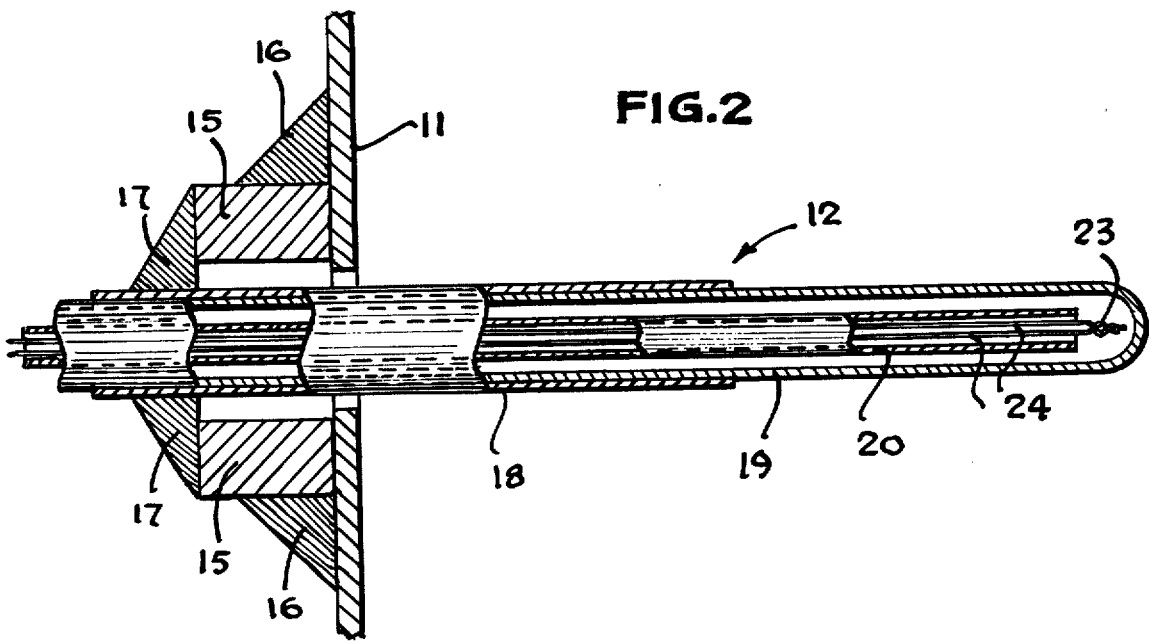
FIG. 2 is a detailed sectional view of a temperature sensing means of the present invention.

FIG. 2 shows a single temperature assembly 12 in more detail. A block 15 is attached to the wall of lower portion 11 by weld 16. Block 15 acts as an adapter to allow convenient placement of tube 18 and thermocouple sheat 19. Tube 18 is attached to block 15 by means of second weld 17 and acts as the primary support means for thermocouple sheath 19. Thermocouple sheath 19 fits more or less snuggly into tube 18. Electrical insulating means 20 act to insulate the individual wires 24 of the thermocouple. One wire 24 is made of iron while the other wire 24 is made of constantan. The wires are left uninsulated near the tip of sheath 19 so that they can be formed, for example, by braiding and welding, into hot junction 23 which is the point at which the temperature is sensed. The opposite ends of each wire 24 are connected to a potentiometer (not shown) which is calibrated so that the electrical potential developed at the hot junction 23 can be used to determine the temperature at the hot junction 23.

The following examples illustrate certain of the advantages of the present invention. However, these illustrations are not to be interpreted as specific limitations on this invention.

EXAMPLES

A fluid catalytic cracking unit is conventionally used in the petroleum industry to produce lower boiling hydrocarbons from higher boiling hydrocarbons in the presence of catalyst in a fluidized ben reaction system. The catalyst, in the form of particles the major portion of which have a maximum linear dimension in the range from about one micron to about 500 microns, passes from the reaction zone into a regeneration zone where carbonaceous deposits on the catalyst particles are removed by combustion. The mixture of catalyst particles and combustion air is separated by means of a conventional cyclone precipitator, the catalyst being deposited in an accumulator such as is shown in FIG. 1.

The ambient temperature, i.e., the temperature of the environment at which the accumulator exists, is noted at 75° to 85°F. The temperature sensor assemblies 12 are numbered from 1 to 8 with the uppermost assembly 12 being numbered 1. With essentially no catalyst in lower portion 11 of the accumulator body 12, each of these temperature sensor assemblies 12 measures essentially the same temperature.

After a period of about 2 hours in which slide vale 21 is "shut" to prevent catalyst from exiting lower portion 11 and the cyclone precipitator causes catalyst particles to flow into the lower portion 11 of the accumulator body 10, the upper six temperature sensor assemblies 12 measure essentially the same temperatures as before, while the lower two temperature sensor assemblies 12 measure significantly, e.g., at least about 30°F., reduced temperatures. These measurements indicate that the level of catalyst particles in the lower portion 11 of accumulator body 12 is at a point higher than the seventh assembly 12 but lower than the sixth assembly 12.

Catalyst particles are allowed to accumulate in the lower portion 11 of accumulator body 10 for an additional 2 hour period of time. At the end of this time, the upper five temperature sensor assemblies measure essentially the same temperatures as before while the lower three temperature sensor assemblies 12 measure significantly reduced temperatures. These temperature measurements indicate that the level of catalyst in the lower portion 11 of accumulator body 10 is higher than the sixth temperature sensor assembly 12 but lower than the fifth temperature sensor assembly 12.

At this point, catalyst slide valve 21 is opened so that a portion of the catalyst is removed from lower portion 11 of accumulator body 12. Slide valve 21 is closed and after approximately 10 minutes the temperatures measured by the upper seven temperature sensor assemblies 12 are essentially the same as when first measured. The temperature measured by the lowest temperature sensor assembly 12 is still significantly reduced.

These results can also be used to illustrate the improved method for determining when less than a predetermined amount of particulate material is present in an accumulator. The temperature sensor assembly numbered 7 is placed in the accumulator body so that it is below the level of particulate material when a predetermined amount of this particulate material is present in the accumulator body. After the catalyst particles are allowed to accumulate in lower portion 11 for 4 hours, the level of particulate material in the accumulator body is above the sixth temperature sensor assembly. However, as catalyst is removed from lower portion 11, the temperature of the seventh temperature sensor assembly increases in relation to the temperature sensed by upper temperature sensor assembly numbered 1. Therefore, the temperature sensor assembly 12 numbered 7 is above the level of particulate material in the accumulator body thus indicating that less than the predetermined amount of catalyst is present in the accumulator body. An alarm, based upon the decreasing temperature difference between the first and seventh temperature sensor assemblies 12 may be signalled to alert operating personnel of this possibly dangerous situation, i.e., low level of catalyst in accumulator body 10.

With slide valve 21 closed, catalyst particles are again allowed to accumulate in the lower portion 11 of accumulator body 10 for a 12 hour period. At the end of this time, the uppermost temperature sensor assembly 12 measures essentially the same temperature as before. However, the temperatures measured by the lower seven temperature sensor assemblies 12 are significantly reduced. These temperatures indicate that the level of catalyst in the lower portion 11 of accumulator body 10 is higher than the second temperature sensor assembly but lower than the first temperature sensor assembly 12. If the second temperature sensor assembly 12 has been placed in the lower portion 11 of accumulator body 10 so that it is above the level of catalyst when a predetermined amount of this catalyst is present in the accumulator body, the decrease in temperature measured by the second assembly 12 relative to that of the first assembly 12 is indicative that more than the predetermined amount of catalyst is present in the accumulator body 10. An alarm, based on the increasing temperature difference between the first and second temperature sensor assemblies 12, may be signalled to alert operating personnel of this possibly dangerous situation, i.e., high level of catalyst in accumulator body 10. Remedial action, e.g., opening slide valve 21 to allow catalyst to exit accumulator body, is taken in response to this alarm.

Figure 3:
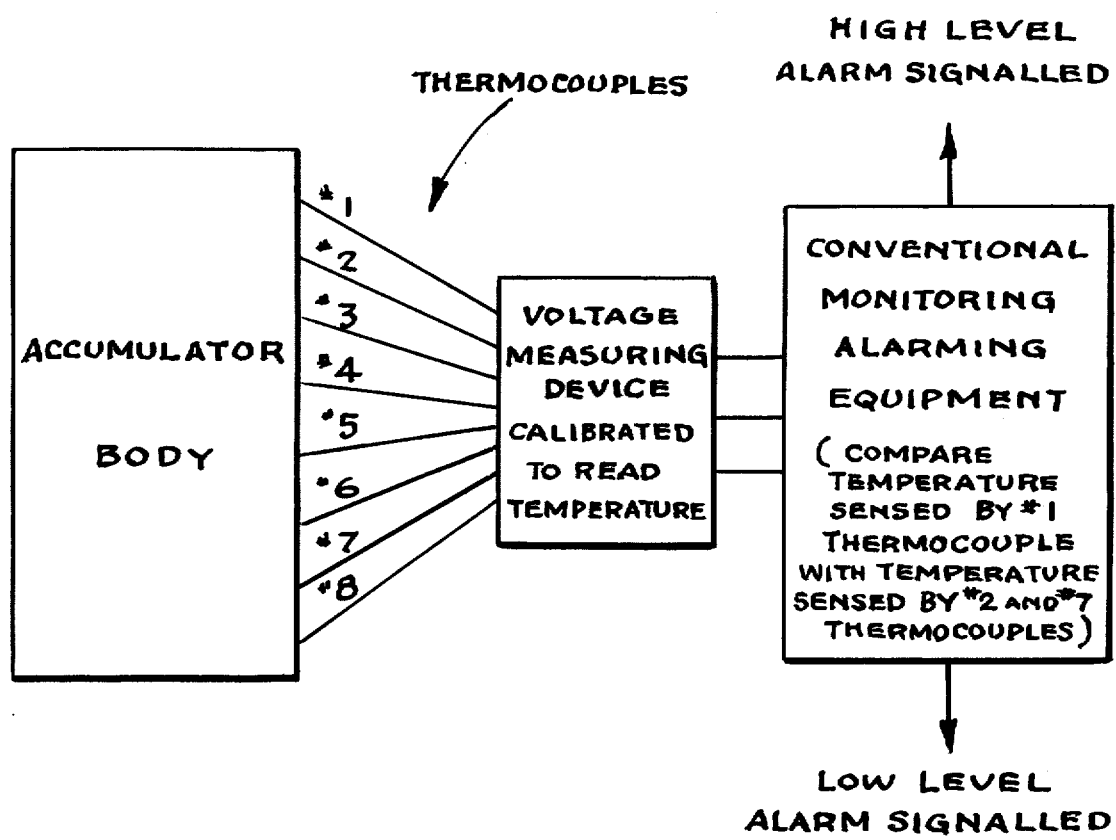
FIG. 3 is a schematic diagram illustrating one system for practicing the present invention.

The alarm function of the present invention is illustrated in more detail in FIG. 3. Thus, the eight thermocouples inserted into accumulator body 10 are also connected to a voltage measuring device, e.g., potentiometer, which is calibrated to read temperature. This voltage measuring device is, in turn, connected to convention monitoring-alarming equipment which may be, for example, electronic. This conventional equipment is used to compare the temperatures measured by the potentiometer to monitor the amount of catalyst in the accumulator body 10 and, if necessary, to signal the high level or low level alarms. For example, when, as described above, the temperature difference between the first and seventh temperature sensor assemblies 12 is decreasing, a low level alarm is signalled by the monitoring-alarming equipment. When the difference in temperatures sensed by the first and second temperature assemblies 12 is increasing, a high level alarm is signalled. When either a high or low level alarm is signalled, corrective action, e.g., opening or closing slide valve 21, may be taken to eliminate the alarm situation. Thus, it can be seen that the present methods can be used in conjunction with conventional monitoring-alarming equipment.

While this invention has been described with respect to various specific examples and embodiment, it is to be understood that the invention is not limited thereto and that it can be variously practiced within the scope of the following claims.

The embodiments of the invention in which an exclusive property or privilege is claimed are defined as follows:

1. A method for monitoring the amount of particulate material in an accumulator having an inlet means located in the upper portion of said accumulator to allow said particulate material to enter said accumulator, provided that said particulate material enters said accumulator at a temperature above the ambient temperature, said method comprising:
   1. determining the temperature at a plurality of points of differing height in said accumulator below said inlet means provided that the uppermost of said points is in the gas above the level of said particulate material and said uppermost point is at substantially the same temperature as said entering particulate material;
   2. repeating step (1) periodically; and
   3. measuring the amount of said particulate material in said accumulator by comparing the temperatures determined in steps (1) and (2) wherein a reduction in temperature at any said lower point relative to the temperature at the uppermost of said points indicates that said lower point is below the level of said particulate material and essentially no change in temperature at said lower point relative to the uppermost of said points indicating that said lower point is above the level of said particulate material.

2. The method of claim 1 wherein said particulate material enters said accumulator at a temperature at least about 100°F. higher than the ambient temperatures.

3. The method of claim 2 wherein said reduction in temperature is at least about 3°F.

4. The method of claim 3 wherein said accumulator includes outlet means located in the lower portion of accumulator and said points of differing height are located between said inlet means and said outlet means.

5. The method of claim 4 wherein said points of differing height are essentially equidistant from the nearest outer wall of said accumulator.

6. The method of claim 5 wherein said particulate material enters said accumulator at a temperature at least about 150°F. higher than the ambient temperature and said reduction in temperature is at least about 60°F.

7. A method for determining when more than a predetermined amount of particulate material is present in an accumulator, said particulate matter entering said accumulator through an inlet means at a temperature above the ambient temperature, which comprises:
   1. determining the temperature at two points of differing height in said accumulator below said inlet means, the lower of these points being in the gas above the level of particulate material when said predetermined amount of particulate material is present in said accumulator and the upper of these points is at substantially the same temperature as said entering particulate material;
   2. repeating step (1) periodically; and
   3. measuring the amount of said particulate material in said accumulator by comparing the temperatures determined in steps (1) and (2) wherein a decrease in temperature at said lower point relative to the temperature at said upper point being indicative that more than said predetermined amount of said particulate material is present in said accumulator body.

8. The method of claim 7 wherein said particulate material enters said accumulator at a temperature at least about 100°F. higher than the ambient temperature.

9. The method of claim 8 wherein said decrease in temperature is at least about 30°F.

10. The method of claim 9 wherein said point are essentially equidistant from the nearest outer wall of the accumulator.

11. The method of claim 10 wherein said particulate material enters said accumulator at a temperature at least about 150°F. higher than the ambient temperature and said decrease in temperature is at least about 60°F.

12. A method for determining when less than a predetermined amount of particulate material is present in an accumulator, said particulate matter entering said accumulator through an inlet means at a temperature above the ambient temperature, which comprises:
   1. determining the temperature at two points of differing height in said accumulator below said inlet means, the lower of these points being below the level of particulate material and the upper of these points being in the gas above the level of particulate material when said predetermined amount of particulate material is present in said accumulator, provided that said upper point is at substantially the same temperature as said entering particulate material;
   2. repeating step (1) periodically; and
   3. measuring the amount of said particulate material in said accumulator by comparing the temperatures determined in steps (1) and (2) wherein an increase in temperature at said lower point to a temperature below or essentially the same as the temperature at said upper point being indicative that less than said predetermined amount of said particulate material is present in said accumulator.

13. The method of claim 12 wherein said particulate material enters said accumulator at a temperature at least about 100°F. higher than the ambient temperature.

14. The method of claim 13 wherein said increase in temperature is at least about 30°F.

15. The method of claim 14 wherein said points of differing height are essentially equidistant from the nearest outer wall of said accumulator.

16. The method of claim 15 wherein said particulate material enters said accumulator at a temperature at least about 150°F. higher than the ambient temperature and said increase in temperature is about 60°F.

* * * * *